Figure 1:
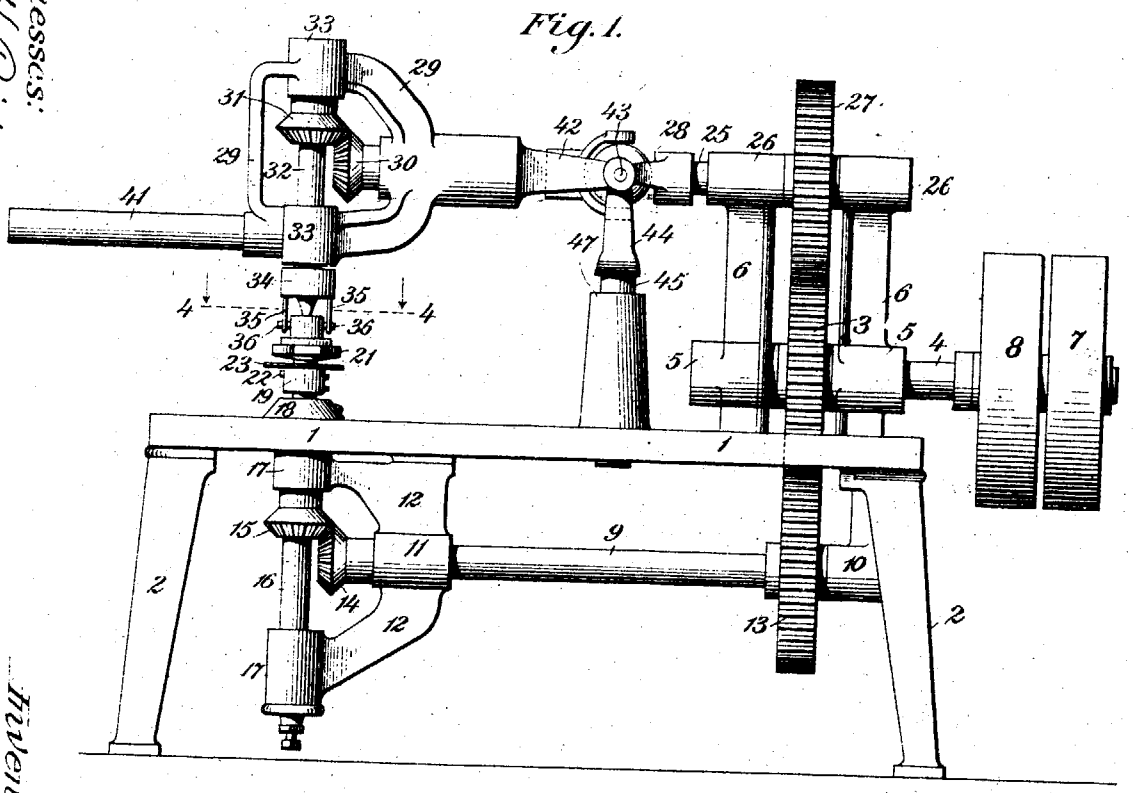

No. 12,790.

REISSUED MAY 5, 1908.

C. F. WALL & C. SAILE.

MACHINE FOR GRINDING TORIC LENSES.

APPLICATION FILED MAR. 27, 1908.

3 SHEETS—SHEET 1.

Witnesses:
J. H. Reid.
Therese O'Donnell

Inventors:
Charles Saile
Charles F. Wall
by Jno. N. Cromwell
Atty

No. 12,790. REISSUED MAY 5, 1908.

C. F. WALL & C. SAILE.

MACHINE FOR GRINDING TORIC LENSES.

APPLICATION FILED MAR. 27, 1908.

3 SHEETS—SHEET 2.

Witnesses:
J. H. Reid.
Thurse O'Donnell

Inventors
Charles Saile
Charles F. Wall
by John A. Cromwell
Atty

No. 12,790. REISSUED MAY 5. 1908.

C. F. WALL & C. SAILE.

MACHINE FOR GRINDING TORIC LENSES.

APPLICATION FILED MAR. 27, 1908.

3 SHEETS—SHEET 3.

Witnesses:
J. H. Reid.
Therese O'Donnell

Inventors:
Charles Saile
Charles F. Wall
by John A. Cromwell
Atty.

UNITED STATES PATENT OFFICE.

CHARLES F. WALL AND CHARLES SAILE, OF PHILADELPHIA, PENNSYLVANIA; SAID SAILE ASSIGNOR TO SAID WALL.

MACHINE FOR GRINDING TORIC LENSES.

No. 12,790. Specification of Reissued Letters Patent. Reissued May 5, 1908.

Original application filed March 1, 1906, Serial No. 303,723. Renewed June 19, 1907, Serial No. 379,796. Original No. 881,168, dated March 10, 1908. Application for reissue filed March 27, 1908. Serial No. 423,791.

*To all whom it may concern:*

Be it known that we, CHARLES F. WALL and CHARLES SAILE, citizens of the United States, residing at Philadelphia, in the county of Philadelphia and State of Pennsylvania, have invented certain new and useful Improvements in Machines for Grinding Toric Lenses; and we do hereby declare the following to be a full, clear, and exact description of the invention, such as will enable others skilled in the art to which it appertains to make and use the same.

This invention relates to improvements in machines for grinding toric lenses.

In grinding lenses of the character mentioned, it is absolutely essential that the lens and the grinding tool shall be so held during the grinding operation that corresponding axes of the lens and tool shall always be maintained in parallel relation. In other words, it is requisite in producing a toric lens that diametrical lines cut in the lens and grinding tool shall always remain in parallelism throughout the grinding operation, and it is therefore the object of the present invention to provide a machine capable of fulfilling the conditions specified; one which is of extreme simplicity, and one which may be produced at minimum expense, operate with economy, accuracy and ease, and which will produce a toric lens in an expeditious manner.

With these general objects in view, and others which will appear as the nature of the improvements is better understood, the invention consists substantially in the novel construction, combination and arrangement of parts, as will be hereinafter fully described, illustrated in the accompanying drawings, and pointed out in the appended claims.

While the invention is illustrated by only the preferred embodiment thereof, it will, of course, be understood that the same is capable of adaptation in other forms, and such forms, though not expressed herein, are considered to fall within the range and scope of the invention.

Figure 2:
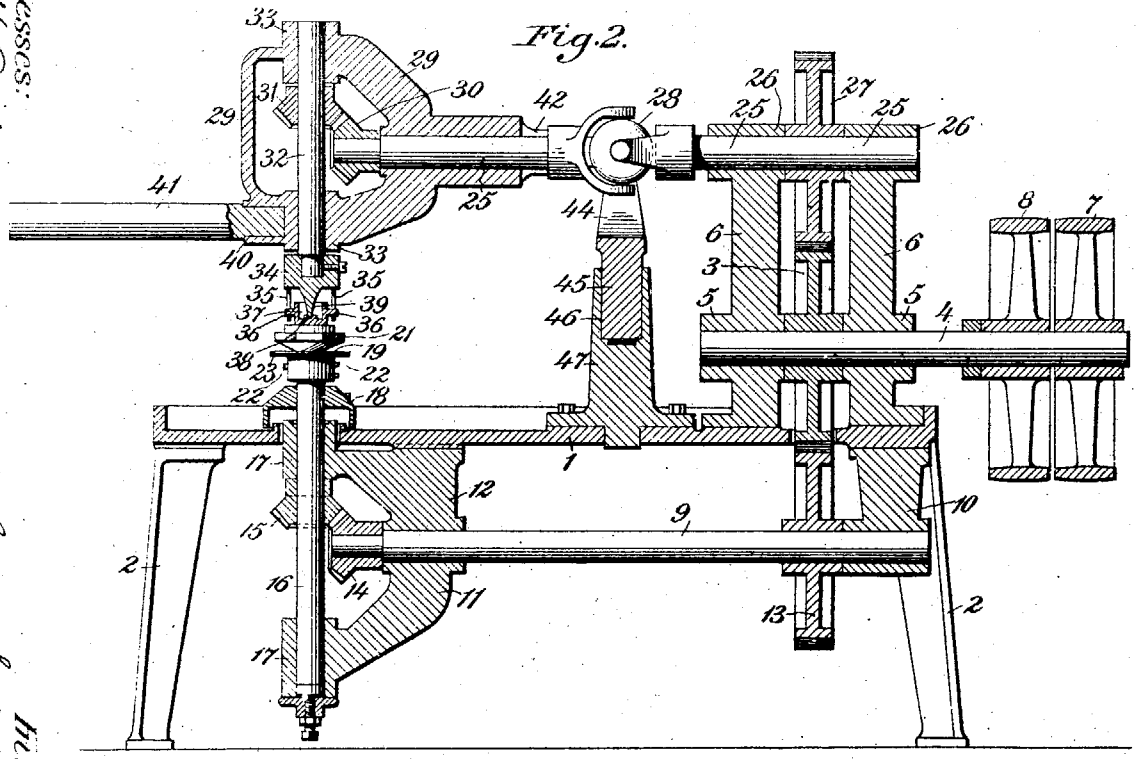
Figure 3:
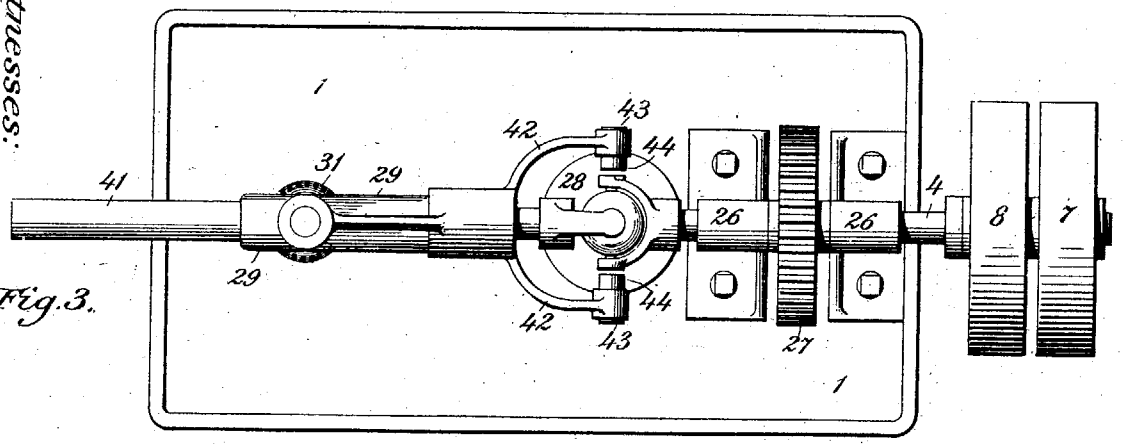
Figure 6:
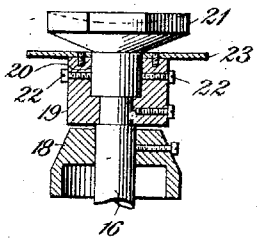
Figure 5:
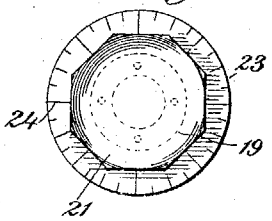
Figure 4:
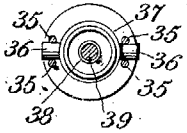

In the drawings—Figure 1 is a side elevation of a toric lens grinding machine constructed in accordance with, and embodying the principle of, the herein-described invention. Fig. 2 is a longitudinal sectional view thereof. Fig. 3 is a top plan view. Fig. 4 is a transverse sectional view on the line 4—4, Fig. 1. Fig. 5 is a top plan view, on an enlarged scale, of the chuck for the grinding tool. Fig. 6 is a transverse sectional view thereof.

Referring in detail to the drawings, the numeral 1 designates the table or bed of the herein-described machine, which table or bed is mounted upon suitable standards or supports 2, and said table and supports are formed of any material suited to the purpose.

Arranged at one end of the table or bed 1 is a master gear 3, the latter being mounted upon a shaft 4 journaled in alined bearings 5 formed in a pair of upwardly-extending standards 6, and the outer end of said shaft 4 is prolonged beyond the end of the table 1 to permit the application thereto of fast and loose pulleys 7 and 8. The standards 6 are bolted or otherwise suitably fastened to the table or bed to be firmly held thereon, and thus preserve the alinement of the shaft bearings.

The numeral 9 designates a lower countershaft, the rear end of said shaft being journaled in a bearing 10 depending from the underside of the table 1, and the forward end of said shaft is likewise journaled in a bearing 11 carried by a depending bracket 12 also arranged at the underside of the bed 1. Mounted upon the countershaft 9, at a point adjacent to the depending bearing 10, is an auxiliary gear 13 the teeth of which mesh with the teeth of the master gear 3, which latter project through the table or bed 1, and thus motion is transmitted from the shaft 4 to the countershaft 9. The latter is also provided at its forward end with a miter gear 14, and said gear 14 meshes with a similar gear 15 carried by a vertically-arranged spindle 16, which spindle passes upwardly through the table or bed 1. The spindle 16 is received by and works within a pair of vertical bearings 17, said bearings being alined and carried by the bracket 12 at points above and below the horizontal bearing 11 in said bracket. It will thus be seen that the spindle 16 is always held at right angles to the countershaft 9, and accurate running of said spindle is thereby insured. It will also be noted that the pinion 15 is arranged immediately below the upper bearing 17, and vertical movement of the spindle 16 thereby prevented. The upper bearing 17 also projects through the table or bed 1, and arranged upon the spindle 16 immediately above said bearing, and in close proximity to the table or bed, is a guard 18 which prevents the abrasive used in the grinding of the lens passing down the spindle 16 and accumulating in the bearings and gears beneath.

The numeral 19 designates the chuck for the grinding tool, the upper end of said chuck being provided with a socket or recess 20 for receiving the grinding tool 21, and said tool has a compound curvature, or curves of different radii, as is characteristic of tools of this character. The tool 21 is held within the chuck 19 through the medium of two binding screws 22, and thus it is evident that said tool may be readily removed whenever desired, or revolved in the chuck to obtain the desired change in axis of the resulting lens. At the upper end of the chuck 19 is mounted an annular plate 23, which plate is of greater diameter than the grinding tool, and said plate 23 is firmly secured to the chuck 19. The plate 23 is provided upon its upper face with a series of graduations 24 indicative of the various degrees to which the tool 21 may be set in accordance with the angle at which it is desired to place the axis of the tool.

Arranged above the table or bed 1 is an upper countershaft 25 the rear end of said shaft being journaled in alined bearings 26 formed at the upper ends of the standards 6, and carried by said countershaft 25, and arranged between the bearings 26, is an upper auxiliary gear 27 which meshes with the master gear 3, and by means of which motion is transmitted to the countershaft 25 from the shaft 4. To render the shaft 25 flexible in order that the lens being ground may be properly operated relatively to the grinding tool, a universal joint 28 is interposed between the ends of said countershaft, and consequently the forward end of said shaft is movable while the rear end, or that upon which the gear 27 is arranged, is fixed. It will thus be seen that the gear 27 maintains a fixed relation to the gear 3, and consequently an ordinary construction of gear may be employed. Sleeved upon the forward end of the shaft 25 is a skeleton head 29, the extremity of the countershaft 25 projecting slightly within said head, and mounted upon said projecting extremity is a miter gear 30, which gear meshes with a similar gear 31 carried by a vertical spindle 32 journaled in vertical bearings 33 which are formed in the head 29 and arranged in vertical alinement. The gear 31 is arranged upon the spindle 32 within the head 29 and at a point just below the upper bearing 33, and consequently vertical displacement of the spindle 32 is prevented.

Arranged at the lower end of the spindle 32 is a head 34 depending from which are diametrically-opposite pairs of guide pins 35, and said pairs of guide pins 35 form ways for the reception of outwardly-extending guide lugs 36 arranged upon the lens carrier 37. The latter is substantially cup-shaped, and its center is provided with a depression or recess 38 for the reception of a centering point 39 carried by the head 34. By means of the construction described it will be seen that the lens carrier 37 has a substantially universal movement upon the centering point 39, being guided in such movement by the lugs 36 working in the ways formed by the guide pins 35, and hence it is evident that the lens arranged upon the carrier will readily conform to the curvature of the grinding tool 21 in the operation of the machine.

The skeleton head 29 is provided with a socket 40 which receives a handle 41, and by means of the latter the head 29 may be shifted across the table or bed 1 in order to shift the lens across the face of the grinding tool 21.

To properly support the head 29 a rearwardly-extending yoke 42 is carried by said head, said yoke having a hinge connection, through the medium of bolts 43, or their equivalent, with a vertically-arranged yoke 44, and the latter is provided with a downwardly-extending stud 45 received by a socket 46 formed in the upper end of a standard 47 bolted or otherwise suitably secured to the table or bed 1. Through the medium of the stud 45 it will be seen that the yoke 44 has a swiveling engagement with the standard 47, and thus the yoke 44 will follow the movements of the head 29 as the latter is moved across the table or bed 1 in moving the lens across the face of the grinding tool.

In the operation of the herein-described machine, power is applied to the master gear 3 through the medium of the fast pulley 7, and a lens having been placed upon the carrier 37 and cemented thereto in the usual manner, the head 29 is shifted to position the lens at the desired point upon the grinding tool 21. As the machine operates, the lens and tool 21 will rotate at the same speed, the diameters of the various intermeshing gears and pinions being the same, respectively, but the axes of rotation of the lens and tool will be in different vertical planes in order to effect the grinding of the toric surface upon the lens. This position may be shifted from time to time through the medium of the handle 41 and the head 29, which shifting is permitted by reason of the universal joint 28 and the yoke connections 42 and 44. A toric lens may thus be produced in an expeditious manner and with great ease and accuracy. In positioning the grinding tool the screws 22 will first be loosened, thus enabling the tool 21 to be rotated in the chuck 19, whereby the tool 21 may be brought opposite the desired graduation to give the proper axis to the lens, whereupon the screws 22 are again tightened, and the tool 21 firmly held in the position to which it is adjusted.

The arrangement of the lower countershaft 9 and the parts for operating the grinding tool 21 being below the table or bed of the machine, said parts will be protected from the emery or other abrasive used upon the grinder, and, as hereinbefore indicated, the guard 18 will effectually exclude the passage of the abrasive downwardly upon the spindle 16. This prevents undue wear incident to the accumulation of the abrasive upon the working parts. Furthermore, the grinding tool 21 may be readily removed from the chuck when occasion requires, or it is necessary to substitute a new tool.

Having thus described the invention, what is claimed as new, and desired to be secured by Letters Patent, is:

1. In a machine for grinding lenses, a grinding tool, a lens carrier, the axis of rotation of one of said elements being fixed, and the axis of the other movable in relation thereto to permit one of said elements moving across the face of the other, and means for operating the grinding tool and the lens carrier without disturbing the parallel relation of corresponding diametrical axes of the tool and carrier.

2. In a machine for grinding lenses, a grinding tool having a fixed axis of rotation, a lens carrier the axis of rotation of which is movable relatively to the axis of rotation of the grinding tool, means for operating the grinding tool and the lens carrier without disturbing the parallel relation of corresponding diametrical axes of the tool and carrier, and means for shifting the position of the lens carrier upon the grinding tool 3. In a machine for grinding lenses, a grinding tool having a fixed axis of rotation, a lens carrier the axis of rotation of which is movable relatively to the axis of rotation of the grinding tool, and means for rotating the grinding tool and the lens carrier without disturbing the parallel relation of corresponding diametrical axes of the tool and carrier.

4. In a machine for grinding lenses, a grinding tool having a fixed axis of rotation, a lens carrier the axis of rotation of which is movable relatively to the axis of rotation of the grinding tool, means for rotating the grinding tool and the lens carrier without disturbing the parallel relation of corresponding diametrical axes of the tool and carrier, and means for shifting the position of the lens carrier upon the grinding tool.

5. In a machine for grinding lenses, a grinding tool, a lens carrier, means for rotating the grinding tool and the lens carrier without disturbing the parallel relation of corresponding diametrical axes of the tool and carrier, and means for varying the position of the lens carrier relative to the grinding tool for changing the relative positions of the axes of rotation of the carrier and tool.

6. In a machine for grinding lenses, a grinding tool having a fixed axis of rotation, a movable head, a lens carrier carried by said head, the axis of rotation of said lens carrier being movable relatively to the axis of rotation of the grinding tool and means for actuating the grinding tool and lens carrier without disturbing the parallel relation of corresponding diametrical axes of the tool and carrier.

7. In a machine for grinding lenses, a grinding tool having a fixed axis of rotation, a movable head, a lens carrier carried by said head, the axis of rotation of said lens carrier being movable relatively to the axis of rotation of the grinding tool, means for actuating the grinding tool and lens carrier without disturbing the parallel relation of corresponding diametrical axes of the tool and carrier, and means associated with said head for manually varying the positions of the axes of rotation of the tool and carrier.

8. In a machine for grinding lenses, a table or bed, a rotatable spindle journaled thereon and having fixed relation thereto, a grinding tool carried by said spindle, a movable support arranged above said grinding tool, a spindle carried by said support, a lens carrier associated with said spindle and movable by said support across the face of the grinding tool, and means for actuating the grinding tool and the lens carrier without disturbing the parallel relation of corresponding diametrical axes of the tool and carrier.

9. In a machine for grinding lenses, a table or bed, a grinding tool journaled thereon and having a fixed axis of rotation, a movable head arranged above said table or bed, a lens carrier operatively related to said head and movable by the latter across the face of the grinding tool to vary the position of the axis of rotation of the lens carrier relatively to the axis of rotation of the grinding tool, and means for actuating the grinding tool and the lens carrier without disturbing the parallel relation of corresponding diametrical axes of the tool and carrier.

10. In a machine for grinding lenses, a table or bed, a grinding tool journaled thereon and having a fixed axis of rotation, a movable head arranged above said table or bed, a lens carrier operatively related to said head and having a substantially universal movement thereon, said lens carrier being movable by said head across the face of the grinding tool to vary the position of the axis of rotation of the lens carrier relatively to the axis of rotation of the grinding tool and means for actuating the grinding tool and the lens carrier without disturbing the parallel relation of corresponding diametrical axes of the tool and carrier.

11. In a machine for grinding lenses, a table or bed, a spindle journaled thereon and having fixed relation thereto, a grinding tool carried by said spindle, a movable head arranged above said table or bed, a spindle carried by said head, a lens carrier associated with said spindle, a connection intermediate the lens carrier and the spindle to permit the carrier having a substantially universal movement thereon, said lens carrier being movable by the head across the face of the grinding tool to vary the position of the axis of rotation of the lens carrier relatively to the axis of rotation of the grinding tool, and means for actuating the grinding tool and the lens carrier without disturbing the parallel relation of corresponding diametrical axes of the tool and carrier.

12. In a machine for grinding lenses, a table or bed, a grinding tool journaled thereon and having a fixed axis of rotation, a lens carrier operatively related to the grinding tool, the axis of rotation of the lens carrier being movable relatively to the axis of rotation of the grinding tool, a master gear, and countershafts interposed between the master gear and the lens carrier and grinding tool respectively, whereby the lens carrier and grinding tool are actuated by said master gear.

13. In a machine for grinding lenses, a table or bed, a grinding tool journaled thereon and having a fixed axis of rotation, a lens carrier operatively related to the grinding tool, the axis of rotation of the lens carrier being movable relatively to the axis of rotation of the grinding tool, a master gear, countershafts interposed between the master gear and the lens carrier and grinding tool respectively, whereby the lens carrier and grinding tool are actuated by said master gear, and means for shifting the position of the lens carrier relative to the grinding tool.

14. In a machine for grinding lenses, a table or bed, a grinding tool journaled thereon, a master gear, a fixed countershaft interposed between the master gear and the grinding tool for actuating the latter, a lens carrier operatively related to the grinding tool and shiftable thereover, and a flexible countershaft interposed between the master gear and the lens carrier, whereby the latter may be actuated from the master gear in accordance with the varying positions of the lens carrier.

15. In a machine for grinding lenses, a table or bed, a grinding tool journaled thereon, a master gear, a fixed countershaft interposed between the master gear and the grinding tool for actuating the latter, a lens carrier operatively related to the grinding tool and shiftable thereover, a movable head with which the lens carrier is associated, and a countershaft connected to said head and interposed between the master gear and the lens carrier, said countershaft permitting movement of said head to vary the position of the lens carrier relatively to the grinding tool, and to permit the lens carrier being actuated in the positions to which it is shifted.

16. In a machine for grinding lenses, a table or bed, a spindle journaled thereon, a grinding tool carried by said spindle, a master gear journaled upon said table or bed, a countershaft interposed between said master gear and the spindle carrying the grinding tool, whereby the latter is actuated by the master gear, a lens carrier arranged above the grinding tool and shiftable across the same, and means for actuating said lens carrier.

17. In a machine for grinding lenses, a table or bed, a spindle journaled thereon, a grinding tool carried by said spindle, a master gear journaled upon said table or bed, a countershaft interposed between the master gear and said spindle for actuating the grinding tool from the master gear, a lens carrier arranged above the grinding tool and shiftable across the same, and a countershaft interposed between the master gear and said lens carrier for actuating the latter by the master gear.

18. In a machine for grinding lenses, a table or bed, a grinding tool journaled thereon, means for actuating said grinding tool, a movable head mounted upon said table or bed, a spindle journaled in said head, a lens carrier associated with said spindle, and means for actuating the lens carrier without disturbing the parallel relation of corresponding axes of the grinding tool and lens carrier.

19. In a machine for grinding lenses, a table or bed, a grinding tool journaled thereon, means for actuating said grinding tool, a movable head mounted upon said table or bed, a spindle carried by said head, a lens carrier associated with said spindle, and a countershaft connected to said head and geared to said spindle for operating the lens carrier, said shaft being actuated by the means for actuating the grinding tool.

20. In a machine for grinding lenses, a table or bed, a spindle journaled thereon, a grinding tool carried by said spindle, a master gear journaled upon said table or bed, a countershaft interposed between said master gear and the spindle carrying the grinding tool for actuating the latter by the master gear, a movable head mounted upon said table or bed, a spindle journaled therein, a lens carrier associated with said spindle, and a countershaft interposed between the master gear and the spindle for actuating the latter and the lens carrier by the master gear.

21. In a machine for grinding lenses, a table or bed, a grinding tool journaled thereon, a master gear, a fixed countershaft interposed between the master gear and the grinding tool for actuating the latter, a lens carrier operatively related to the grinding tool and shiftable thereover, a movable head with which the lens carrier is associated, a countershaft connected to said head and interposed between the master gear and the lens carrier, and a universal joint included in the latter countershaft to permit movement of said head to vary the position of the lens carrier relatively to the grinding tool, and to permit the lens carrier being actuated in the positions to which it is shifted.

22. In a machine for grinding lenses, a table or bed, a grinding tool journaled thereon, a master gear, a fixed countershaft interposed between the master gear and the grinding tool for actuating the latter, a lens carrier operatively related to the grinding tool and shiftable thereover, a movable head with which the lens carrier is associated, a countershaft interposed between the master gear and the lens carrier and to which said head is connected, a universal joint included in the latter countershaft to permit movement of said head to vary the position of the lens carrier relatively to the grinding tool, and to permit the lens carrier being actuated in the positions to which it is shifted, a yoke associated with said head and countershaft, and a vertically-extending yoke swiveled upon the table or bed and to which the first-mentioned yoke is hingedly connected.

23. In a machine for grinding lenses, a table or bed, a spindle journaled thereon, a grinding tool carried by said spindle, a spindle arranged above said grinding tool, a head carried by said spindle, a lens carrier associated with said head and having universal movement thereon, said lens carrier being shiftable across the grinding tool, and means for operating the grinding tool and the lens carrier.

24. In a machine for grinding lenses, a table or bed, a spindle journaled thereon, a grinding tool carried by said spindle, a spindle arranged above said grinding tool, a head carried by said spindle, depending guides carried by said head, a lens carrier associated with said head, guide lugs arranged upon said lens carrier and coöperating with the depending guides of said head whereby said lens carrier is capable of universal movement upon said head, said lens carrier being shiftable across the grinding tool, and means for operating the grinding tool and the lens carrier.

25. In a machine for grinding lenses, a table or bed, a spindle journaled thereon, a grinding tool carried by said spindle, a spindle arranged above said grinding tool, a head carried by said spindle, depending guides carried by said head, a centering point depending from said head, a lens carrier associated with said head and having a socket for the reception of said centering point, guide lugs arranged upon the lens carrier and coöperating with the depending guides of said head, and means for operating the grinding tool and the lens carrier.

26. In a machine for grinding lenses, a table or bed, a grinding tool journaled thereon, a movable head arranged above said table or bed, a spindle arranged in said head, a head carried by said spindle, a lens carrier associated with said head and having universal movement thereon, and means for operating the grinding tool and the lens carrier.

27. In a machine for grinding lenses, a table or bed, a grinding tool journaled thereon, a movable head arranged above said table or bed, a spindle journaled in said head, a lens carrier associated with said spindle and having universal movement thereon, said lens carrier being shiftable across the grinding tool, a master gear, a shaft interposed between said spindle and said master gear, a universal joint arranged in said shaft, whereby the lens carrier may be shifted across the grinding tool, and means for actuating the grinding tool from said master gear.

28. In a machine for grinding lenses, a table or bed, a grinding tool journaled thereon, a movable head arranged above said table or bed, a spindle journaled in said head, a lens carrier associated with said spindle and having universal movement thereon, said lens carrier being shiftable across the grinding tool, a master gear, a shaft interposed between said spindle and said master gear, a universal joint arranged in said shaft, whereby the lens carrier may be shifted across the grinding tool, a yoke associated with said head and said countershaft, a vertically-extending yoke swiveled upon the table or bed and to which the first-mentioned yoke is hingedly connected, and means for actuating the grinding tool from said master gear.

29. In a machine for grinding lenses, a table or bed, a grinding tool journaled thereon, a movable head arranged above said table or bed, a spindle journaled in said head, a head associated with said spindle, depending guides carried by said head, a lens carrier, outwardly-extending lugs carried by said lens carrier and coöperating with said guides, whereby said lens carrier has universal movement upon said head, said carrier being shiftable across the grinding tool, a master gear, a shaft interposed between said spindle and said master gear, a universal joint arranged in said shaft, whereby the lens carrier may be shifted across the grinding tool, a yoke associated with said head and countershaft, a vertically-extending yoke swiveled upon the table or bed and to which the first-mentioned yoke is hingedly connected; and means for actuating the grinding tool from the master gear.

30. In a machine for grinding lenses, a table or bed, a spindle journaled thereon and projecting therethrough, a grinding tool carried by said spindle, a lens carrier arranged above said grinding tool and shiftable across the same, means for actuating the grinding tool and the lens carrier, and a guard carried by said spindle to prevent the abrasive employed in the grinding operation passing down said spindle.

31. In a machine for grinding lenses, a table or bed, a spindle journaled thereon, a chuck carried by said spindle, means associated with said chuck for indicating the various degrees to which the tool inserted in the chuck may be set in accordance with the angle at which it is desired to place the axis of the tool, a lens carrier arranged above said chuck and shiftable in relation thereto, and means for actuating said chuck and said lens carrier.

32. In a machine for grinding lenses, a table or bed, a spindle journaled thereon, a chuck carried by said spindle, a graduated plate associated with said chuck for indicating the various degrees to which the tool inserted in the chuck may be set in accordance with the angle at which it is desired to place the axis of the tool, a lens carrier arranged above said chuck and shiftable in relation thereto, and means for actuating said chuck and said lens carrier.

33. In a machine for grinding lenses, a chuck for receiving the grinding tool, and a graduated plate associated with said chuck for indicating the various degrees to which the tool inserted therein may be set in accordance with the angle at which it is desired to place the axis of the tool.

34. In a machine for grinding lenses, a chuck, and a plate associated with said chuck, said plate having graduations upon its upper face for indicating the various degrees to which the tool inserted in the chuck may be set in accordance with the angle at which it is desired to place the axis of the tool, said plate being of greater diameter than the chuck for exposing to view the graduations thereon when the tool is inserted in the chuck.

35. In a machine for grinding lenses, a table or bed, a vertical spindle journaled thereon, a grinding tool carried by said spindle, a master gear journaled upon said table or bed, a horizontal countershaft interposed between said master gear and the spindle carrying the grinding tool for actuating the latter by the master gear, a movable head mounted upon said table or bed, a vertical spindle journaled therein, a lens carrier associated with said spindle, and a horizontal countershaft interposed between the master gear and the last-mentioned spindle for actuating the latter and the lens carrier by the master gear.

36. In a machine for grinding lenses, a table or bed, a vertical spindle journaled thereon, a grinding tool carried by said spindle, a master gear journaled upon said table or bed, a horizontal countershaft interposed between said master gear and the spindle carrying the grinding tool for actuating the latter by the master gear, a movable head arranged above said table or bed, a vertical spindle journaled thereon, a lens carrier associated with said spindle, a horizontal countershaft interposed between the master gear and said last-mentioned spindle for actuating the latter and the lens carrier by the master gear, a yoke associated with said head and the last-mentioned countershaft, and a vertically-extending yoke swiveled upon the table or bed and to which the first-mentioned yoke is hingedly connected.

In testimony whereof we affix our signatures, in the presence of two witnesses.

CHARLES F. WALL.
CHARLES SAILE.

Witnesses:
J. HARRY BOWERS,
WILLIAM L. WALL.